Jan. 2, 1945. H. J. LUTH ET AL 2,366,274
PLASTIC FASTENING MEANS AND METHOD OF APPLYING THE SAME
Filed June 3, 1942
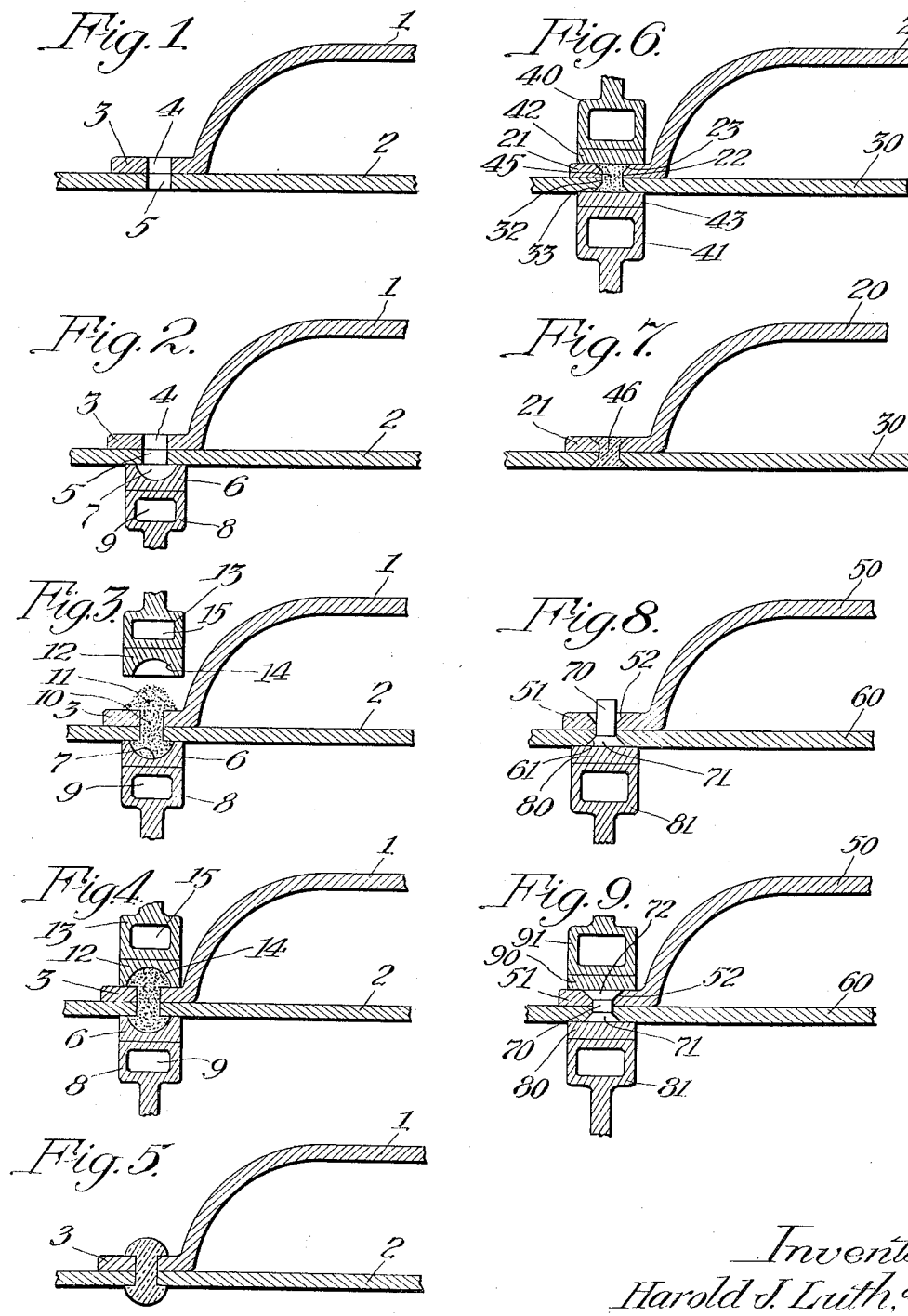
Inventors
Harold J. Luth, and
Herman B. Scheidemantel Patented Jan. 2, 1945

2,366,274

UNITED STATES PATENT OFFICE 2,366,274

PLASTIC FASTENING MEANS AND METHOD OF APPLYING THE SAME

Harold J. Luth, Muskegon Heights, and Herman B. Scheidemantel, Muskegon, Mich., assignors to The Brunswick-Balke-Collender Company, Chicago, Ill., a corporation of Delaware Application June 3, 1942, Serial No. 445,688

16 Claims. (Cl. 18—59)

This invention relates to means for fastening together two pieces of material or two parts of an assembly where the parts are composed of thermo-setting material and the fastening means is composed of thermo-plastic material.

One object of the invention is to provide a new and improved fastening means and method of applying the same.

Another object of the invention is to form a secure and satisfactory joint between two parts by assembling them with apertures in the two parts in registration and then filling the apertures with thermo-plastic material and finally molding such material into permanent form adapted to serve as a fastening for the parts.

A further object of the invention is to provide a satisfactory non-metallic fastening means for securing together two elements, and particularly a fastening of plastic nature which can be molded into its final form in situ.

More specifically it is an object of the invention to provide a method of fastening together two parts of an assembly which includes arranging said parts with registered apertures in the two parts, temporarily supporting in said apertures a quantity of plastic material in dry powder form, then applying means to confine said material to the registered apertures and the immediate vicinity thereof, and finally applying heat to render the material plastic and set the same in place, whereby said plastic material constitutes a series of rivets permanently securing the parts together.

It is also an object of the invention to provide an alternative method of fastening together two parts of an assembly which includes pre-forming a rivet of thermo-plastic material, preferably with a head at one end, then arranging said parts with the apertures of the two parts in registered relation, inserting the pre-formed rivet into said registered apertures, applying heat to the end of the rivet opposite its head to soften the plastic material, and applying pressure to form a second head on the rivet, whereby, upon cooling, it constitutes a permanent fastening element for the two parts.

And there is also included among the objects of the invention the method of fastening together two parts which includes arranging said parts with a plurality of apertures in registered relation, placing in said apertures a plurality of pre-formed rivets of thermo-plastic material and then applying heat and pressure to all said rivets simultaneously to soften and deform them into permanent fastening devices which on cooling serve to secure the parts together.

Other objects and advantages of the invention will appear from the following description, taken in conjunction with the drawing, in which:

Figure 1 is a fragmentary detail section showing two parts of sheet material disposed with certain areas in contact, and with apertures in said areas registering with each other as an initial step in the assembly process;

Figure 2 is a similar sectional view, showing portions of said parts supported on an element which forms a closure for the lower one of the registered apertures;

Figure 3 illustrates the same parts in section with the addition of powdered plastic material filling the registered openings;

Figure 4 also shows the same parts in section with the powdered plastic material confined between upper and lower platens preparatory to the application of heat;

Figure 5 is a fragmentary section view showing the parts joined by means of a finished plastic rivet;

Figure 6 is a sectional view similar to Figure 4 showing the powdered plastic material in place in counter-bored apertures in the parts so as to form a rivet with counter-sunk heads;

Figure 7 is a sectional view showing two parts joined by a plastic rivet with counter-sunk heads;

Figure 8 is a sectional fragmentary detail showing two parts disposed in contact and with a pre-formed plastic rivet positioned in registered apertures of the parts ready for securement;

Figure 9 is a similar sectional view showing heat and pressure means in the process of forming a second head on the rivet.

While the invention is susceptible of various modifications and alternative constructions, the embodiments shown in the drawing and described hereinafter are by way of preferred illustration only, and it is not intended that the invention be limited thereto or thereby, but it is the intention to cover all modifications and alternative constructions falling within the spirit and scope of the invention as defined by the appended claims.

In many manufacturing processes it has been customary to connect parts of non-metallic sheet material, such as vulcanized fibre, or resin-impregnated paper stock, by using hollow rivets or eyelets of metallic construction, or by using staples of wire, or other metallic fastenings. In some instances, as for example, in certain electrical equipment, the use of metal is objectionable, and in other cases it is desirable to conserve metal where substitute materials can be employed. The present invention aims to provide such a substitute material and a method of applying it as a fastening for parts which are to be permanently secured in assembled relation.

Figure 1 may represent two parts, 1 and 2, of sheet material, preferably of a character which is thermo-setting—that is, which will not be melted or deformed by the application of a moderate quantity of heat but which is given its permanent form in a previous process of manufacture and will retain it throughout a reasonable temperature range. The part 1 is shown as having a flange portion 3 in which it may be understood there are a series of apertures such as that indicated at 4, while the part 2 has a series of corresponding apertures 5 positioned to register respectively with the apertures 4 when the two parts are disposed in face to face relation.

Preferably the parts 1 and 2, when assembled in this relation, are supported upon a mold member 6 having in its upper surface a series of recesses 7, each positioned to register with the apertures 5 of the part 2, as shown in Figure 2. The mold member 6 is carried upon, and may be permanently secured to, a steam platen 8 which is of hollow form and provided with a steam passage 9 for heating it.

The bore, composed of the registering apertures 4 and 5 and the recess 7, is then filled with thermo-plastic material in dry powder form, as indicated at 10 in Figure 3, and a portion of the material may be heaped up over the aperture 4 as indicated at 11. Then a second mold member 12 is fitted on to the flange 3 of the member 1 with a second steam platen 13 associated with it. The mold member 12 is formed with recesses 14 which register with the apertures 4 to accommodate the little heaps of powdered material 11, as seen in Figure 4. Thereupon the upper and lower platens are confined by suitable clamping means, not shown, and heat is applied by passing steam through the cavities 9 and 15 of the steam platens 8 and 13, respectively. This heat passing into the mold members 6 and 12 serves to melt the plastic material, which fills the registered apertures 4 and 5 and the recesses 7 and 14, thus fusing the material into a continuous homogeneous plastic mass, which is confined by the apertures and recesses so as to form a rivet with heads engaging the opposite outer faces of the parts 1 and 2.

There are various plastic materials suitable for this purpose; for example, those composed primarily of cellulose acetate, or cellulose nitrate, and these materials after having been rendered plastic by the application of heat, have the property of hardening when cooled to ordinary room temperature. Accordingly, after the powdered material has been rendered plastic and sufficiently fluid to insure the formation of the rivets as just described, the application of heat may be discontinued and shortly thereafter the steam platen and mold members 6 and 12 may be disengaged from the assembled parts, leaving the rivets of plastic material with only their head portions exposed, and allowing the cooling process to continue. Since the elements 1 and 2 are of thermo-setting material, they will not be deformed or decomposed by the application of heat as described for the formation of the fastening rivets and the final assembly will be quite as satisfactory as though metal fastening members were employed. An example of such thermosetting material suitable for the application of this process is a type of paper stock impregnated with phenol formaldehyde resin commercially known as Formica.

If the formation of headed rivets is objectionable, the parts which are to be connected may be constructed as indicated in the fragmentary sectional view of Figure 6 in which the members 20 and 30 are shown with a flange 21 of the member 20 disposed in face to face relation to the part 30. An aperture 22 in the flange 21 is counter-sunk at 23 and similarly an aperture 32 in the part 30 is counter-sunk at 33. The steam platens 40 and 41 are then provided merely with flat pressure members 42 and 43, respectively, which close the upper and lower ends of the bore composed of the apertures 22 and 32 and their counter-sunk portions. Before the upper platen 40 is brought into position, this bore may be filled with powdered plastic material, indicated at 45, so that when the platens are brought into the position shown in Figure 6 and heat is applied thereby, this material will be formed into a continuous plastic rivet with flared heads, filling the counter-sunk portions of the apertures but extending flush with the outer faces of the flange 21 and the part 30, as shown in Figure 7, at 46.

For many purposes it is preferable to provide pre-formed rivets of thermo-plastic material which can be set into registered apertures in the parts which are to be connected and to which heat and pressure may then be applied to form a second head on the rivet and secure it in final position. Figure 8 shows two parts, 50 and 60, of thermo-setting material, with a flange 51 of the part 50 disposed in contact with an area of the part 60 and with a pre-formed rivet 70 positioned in registered apertures in the contacting portions of the parts. In the form shown the rivet includes a flat head 71 which occupies a correspondingly shaped counter-bore 61 in part 60. The shank of the rivet extends upwardly through the apertures and projects above the upper surface of the flange 51. A counter-bore 52 is formed in this upper surface.

Preferably, though not necessarily, the assembly of the parts up to this point should take place in the machine in which they are to be finally secured, so that the heads 71 of the preformed rivets rest upon the table or pressure member 80 which may be carried on a steam heated platen 81. A second pressure member 90 with a heated platen 91 is then brought down onto the protruding ends of the rivets 70 so that they are softened and then re-shaped by the heat and pressure to fill the counter-bore 52 and form a second head 72 on the rivet 70, as indicated in Figure 9.

One special advantage of this method, as compared with the use of metallic rivets which are individually hammered into final form, is that for quantity production of an assembly composed of two or more parts secured together by a plurality of rivets, the parts may be assembled with all the pre-formed plastic rivets in position and resting upon one pressure plate of a suitable press or assembling machine, and then the necessary heat and pressure can be applied by the other pressure member to all the rivets simultaneously. In this way all the rivets are simultaneously re-shaped and pressed into their final securing positions by a single operation of the pressure platen, requiring no more time to complete the setting of a plurality of rivets than it would take for a single rivet of the plastic type. This means that all the rivets can be set in about the same time which would be required for securing a single rivet of the metallic type.

We claim as our invention:

1. The method of securing two parts together which comprises assembling said parts in face to face relation with a hole in one part registering with a hole in the other to form a continuous bore extending through the plane of contact of said parts, filling said bore with non-metallic thermo-plastic material in powdered form, and forming said material with the aid of heat into an integral securing member occupying said bore and engaging outwardly facing surfaces of each of said parts and maintaining said material in that form until it has become hardened on cooling.

2. The method of securing two parts together which comprises assembling said parts in face to face relation with a hole in one part registering with a hole in the other to form a continuous bore extending through the plane of contact of said parts, filling said bore with non-metallic thermo-plastic material in powdered form, supporting a quantity of said material in the approximate shape of a head at each end of the bore and in contact with the material in the bore, and forming said material with the aid of heat into an integral securing member occupying said bore and having heads at its opposite ends engaging outwardly facing surfaces of each of said parts, and maintaining said material in that form until it has become hardened on cooling.

3. The method of securing two parts together which comprises assembling said parts in face to face relation with a hole in one part registering with a hole in the other to form a continuous bore extending through the plane of contact of said parts, filling said bore with non-metallic thermo-plastic material in powdered form, clamping said parts together by means which closes said bore at both ends, applying heat to said clamping means and therefrom to the material in the bore until said material is fused into an integral, substantially homogeneous fastener occupying said bore and engaging outwardly facing surfaces on each of said parts, and maintaining said material in that form until it has become hardened on cooling.

4. The method of securing two parts together which comprises assembling said parts in face to face relation with a hole in one part registering with a hole in the other to form a continuous bore extending through the plane of contact of said parts, filling said bore with non-metallic thermo-plastic material in powdered form, clamping said parts together by means which provides mold chambers registering with both ends of said bore and overlying portions of the outer surfaces of said parts adjacent said bore, said chamber being filled with non-metallic thermo-plastic material like that in the bore, applying heat to said clamping means and therefrom to the material in said mold chambers and in said bore until said material is fused into an integral fastening member occupying said bore and having heads at both ends engaging the outer surfaces of said parts, and maintaining said material in that form until it has become hardened on cooling.

5. The method of securing two parts together which comprises forming in each part a hole counter-sunk at one end, assembling said parts in face to face relation with the holes registering to form a continuous bore and with their countersunk portions at opposite ends of said bore, disposing the assembled parts against a platen which closes one end of the bore, filling said bore with non-metallic thermo-plastic material in powdered form, securing a second platen against the opposite end of the bore, and applying heat to the powdered material until it is fused into an integral fastener with heads occupying the counter-bores and with its intervening portion tying the two parts together and maintaining said material in that form until it has become hardened on cooling.

6. Method of securing together two parts formed of a thermo-setting material which is in the infusible state, each of which parts has a hole formed therein which comprises assembling the said parts with the said holes registered as portions of a continuous bore, filling said bore with non-metallic thermo-plastic material in powdered form which thermo-plastic material fuses at a temperature below the maximum temperature to which said infusible thermo-setting material is resistant, confining some of said non-metallic thermo-plastic material at each end of the bore in the form of a head, and fusing the said thermo-plastic material into an integral, headed, rivet-like fastener occupying said bore and engaging outwardly-facing surfaces on each of said parts, the said thermo-plastic material being fused as aforesaid by heating it to a temperature below the aforesaid maximum temperature, and then maintaining the said thermo-plastic material in said fastener form until it has become hardened on cooling.

7. The method of securing together two parts of sheet material each having a hole formed therein and each being composed of paper stock impregnated with a phenolic formaldehyde resin which is in the infusible state, which comprises assembling the parts with said holes registered as portions of a continuous bore and with said parts disposed face to face, filling said bore with a thermo-plastic composition comprising a thermo-plastic cellulose compound in powdered form which thermo-plastic composition fuses at a temperature below the maximum temperature to which said infusible phenolic formaldehyde resin is resistant, closing said bore at both ends and fusing the said thermo-plastic composition into an integral fastening member occupying said bore and engaging outwardly facing surfaces of each of said parts by heating said thermo-plastic composition to a temperature below the aforesaid maximum temperature and then maintaining the said thermo-plastic composition in said fastener form until it has become hardened on cooling.

8. The combination of two parts of thermosetting material assembled with opposing areas in contact and having a series of holes in one part registered respectively with a series of holes in the other part, said holes extending through the contacting areas, and securing elements formed of a non-metallic thermo-plastic material extending through each pair of registered holes and having integral heads at both ends engaging the outer surfaces of the parts.

9. The combination of two parts of thermosetting material assembled with opposing areas in contact and having a series of holes in one part registered respectively with a series of holes in the other part, said holes extending through the contacting areas and having counter-sunk portions adjacent the outer surfaces of said parts, and securing elements formed of a non-metallic thermo-plastic material extending through each pair of registered holes with integral heads at both ends occupying the countersunk portions of the holes.

10. The method of securing together two parts of thermo-setting material which comprises forming a hole in each part, assembling the parts with said holes registered, inserting in the registered holes a rivet body of non-metallic thermo-plastic material with at least one end protruding from the opening provided by said registered holes, molding said protruding portion into a rivet head with the aid of heat and pressure, and then maintaining said rivet so formed in place until it has become hardened on cooling.

11. The method of securing together two parts of thermo-setting material which comprises forming a hole in each part, assembling the parts with said holes registered, inserting in the registered holes a rivet of non-metallic thermo-plastic material pre-formed with a head on one end, said rivet being positioned in said holes with its head engaging an outwardly facing surface on one of said parts with its other end protruding from the other end of the opening provided by said registered holes, softening and spreading said protruding portion with the aid of heat and pressure into permanent fastening engagement with an outwardly facing surface of the adjacent part, and then maintaining said rivet so formed in place until it has become hardened on cooling.

12. The method of securing together two parts of thermo-setting material which comprises forming a plurality of holes in each part, assembling the parts with the holes of one part registered respectively with the holes of the other, inserting in the registered holes a plurality of rivets of non-metallic thermo-plastic material, each with at least one end protruding from the opening provided by said registered holes, softening and forming the said protruding portions of said plurality of rivets simultaneously into rivet heads with the aid of heat and pressure, and then maintaining the said rivets so formed in place until they have become hardened on cooling.

13. The method of securing two parts together with a non-metallic thermo-plastic material which comprises assembling in face to face relation two parts of material which are resistant to temperatures in the range at which said thermo-plastic material is molded, said two parts each having a hole therein and said two parts being assembled with said two holes registered to form a continuous bore extending through the plane of contact of said parts, filling said bore with said thermo-plastic material in powdered form, forming said thermo-plastic material with the aid of heat into an integral securing member occupying said bore and engaging outwardly facing surfaces on each of said parts and maintaining said thermo-plastic material in that form until it has become hardened on cooling.

14. The combination of two parts of thermo-setting material assembled in face to face relation with a series of holes in one part registering with a series of holes in the other part to form a series of continuous bores extending through the contacting areas of said parts and securing elements formed of non-metallic thermo-plastic material occupying each of said bores and engaging outwardly facing surfaces on each of said parts.

15. The combination of two parts of thermo-setting material assembled in face to face relation with a hole in one part registering with a hole in the other part to form a continuous bore extending through the plane of contact of said parts and a securing element formed of non-metallic thermo-plastic material occupying said bore and engaging outwardly facing surfaces on each of said parts.

16. The combination of two parts of thermo-setting material assembled in face to face relation with a hole in one part registering with a hole in the other part to form a continuous bore extending through the plane of contact of said parts and a securing element formed of a thermo-plastic composition comprising a thermo-plastic cellulose compound occupying said bore and engaging outwardly facing surfaces on each of said parts.

HAROLD J. LUTH.
HERMAN B. SCHEIDEMANTEL.